United States Patent
Harrer et al.

[11] Patent Number: 5,299,490
[45] Date of Patent: Apr. 5, 1994

[54] PISTON WITH FLUSH CONNECTING WALL SECTIONS AT PIN BOSS SURFACE

[75] Inventors: Josef Harrer, Allersberg; Klaus Kofahl, Weinstadt-Beutelsbach; Peter Stocker, Sulzbach a.d. Murr, all of Fed. Rep. of Germany

[73] Assignee: Alcan Deutschland GmbH, Fed. Rep. of Germany

[21] Appl. No.: 944,652

[22] Filed: Sep. 14, 1992

[30] Foreign Application Priority Data

Mar. 20, 1991 [DE] Fed. Rep. of Germany ....... 4109160

[51] Int. Cl.$^5$ ............................ F16J 1/04; F01M 1/00
[52] U.S. Cl. ......................................... 92/208; 92/233; 123/193.6
[58] Field of Search ................. 123/193.6, 197.2; 92/208, 209, 214, 233, 237

[56] References Cited

U.S. PATENT DOCUMENTS

| | | | |
|---|---|---|---|
| 1,763,523 | 6/1930 | Jardine | 92/236 |
| 3,319,535 | 5/1967 | Holcombe | 92/208 |
| 4,161,165 | 7/1979 | Belush et al. | 123/193.6 |
| 4,683,808 | 8/1987 | Wacker et al. | 92/208 |
| 4,694,735 | 9/1987 | Tatematsu et al. | |
| 4,856,417 | 8/1989 | Ishikawa | 123/193.6 X |
| 5,000,078 | 3/1991 | Gabele | 123/193.6 X |
| 5,054,375 | 10/1991 | Kawabata et al. | 123/193.6 X |
| 5,076,225 | 12/1991 | Tokoro et al. | 92/208 X |

FOREIGN PATENT DOCUMENTS

| | | |
|---|---|---|
| 0171825 | 2/1989 | European Pat. Off. . |
| 0385390 | 9/1990 | European Pat. Off. . |
| 0430362 | 6/1991 | European Pat. Off. . |
| 2430829 | 1/1976 | Fed. Rep. of Germany . |
| 3523438 | 3/1988 | Fed. Rep. of Germany . |
| 64-3054 | 1/1989 | Japan . |

OTHER PUBLICATIONS

5781143 May 1982 Japanese abstract.

Primary Examiner—Edward K. Look
Assistant Examiner—John Ryznic
Attorney, Agent, or Firm—Stevens, Davis, Miller & Mosher

[57] ABSTRACT

The invention relates to a piston, particularly of light metal, for internal combustion engines, comprising a piston skirt substantially closed in the peripheral direction, pin bosses set back with respect to the piston skirt diameter in the direction of the piston axis, and two supporting skirt wall sections which thus remain on the piston skirt on the thrust and the counter-thrust side. The supporting skirt wall section on the thrust side is larger at least in the peripheral direction of the skirt than the supporting skirt wall section on the counter-thrust side.

In order to divert the lateral forces acting on the supporting surfaces to the entire supporting structure in an elastically cushioned but safe manner, the two wall sections of the skirt connecting the supporting wall sections are respectively continuously curved convexly outwards as seen along the periphery of the piston skirt at least at the open skirt end beneath the pin bosses. The cross-sectional configuration of the piston skirt can therefore be described as being "egg-shaped".

13 Claims, 2 Drawing Sheets

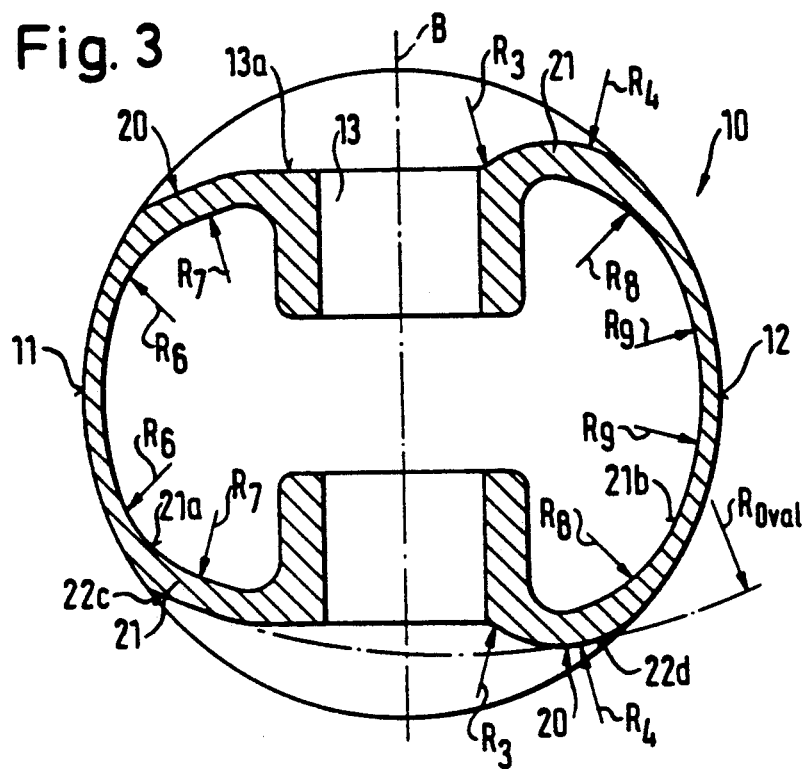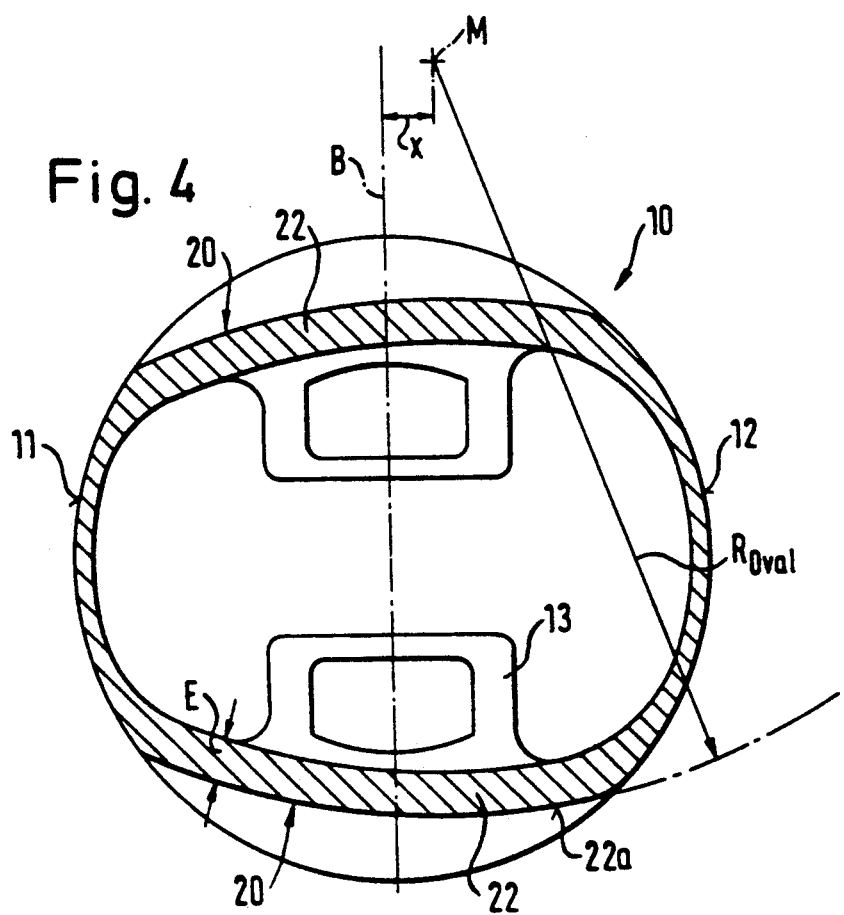

PISTON WITH FLUSH CONNECTING WALL SECTIONS AT PIN BOSS SURFACE

BACKGROUND OF THE INVENTION

This invention relates to a piston, in particular of light metal, for internal combustion engines having substantially circular sleeves, comprising a piston skirt substantially closed along its periphery, pin bosses set back with respect to the piston skirt diameter in the direction towards the piston axis to the extent that the spacing between the outer pin boss surfaces corresponds to 60 to 80% of the piston diameter. Two supporting skirt wall sections remain on the piston skirt on the thrust and counter-thrust side and receive the transverse forces. The supporting skirt wall section on the thrust-side is larger at least in the peripheral direction of the skirt than the supporting skirt wall section on the counter-thrust side. Two wall sections connect the supporting skirt wall sections which are continuously convexly curved outwards along the piston skirt periphery at least at the open end of the skirt.

Such pistons are known from Japanese utility model publication JP-A-64-3054. They are the result of a long development. In order to fulfill the general motor-technical development aims of:

High power compression corresponding to high revolutions of the motor,
quiet running of the pistons, and
low power loss due to friction between the piston and the cylinder, it has already been attempted for a long time to:
maintain the piston weight as low as possible by means of far-reaching reduction in the wall thickness;
optimize the supporting skirt surfaces of the piston, responsible for receiving the transverse forces, to the extent that they are not larger than necessary, in order to prevent a forcing through of the oil film due to the effect of the specific surface thrust, and to the extent that they are as small as possible in order to maintain as low as possible the shear forces which are constantly to be overcome in the oil film; and
reduce the play between the piston and cylinder wall to the greatest extent possible in order to limit rocking movements of the piston and deflection noises.

In proceeding towards these aims, the piston skirt was initially developed from a cylindrical to an oval, crowned outer shape in the sense that the skirt was reduced to a small extent of under 1 mm in the direction of the pin axis from the contact point on the cylinder wall in order to allow the piston to elastically mitigate dimensional overlapping due to thermal expansion in the connecting rod pivoting plane. On account of this measure, the assembly play perpendicular to the gudgeon pin axis could be reduced.

Further development towards always greater reduction of the piston skirt lead to the so-called box- or H-piston, which only had somewhat cylindrical skirt regions as supporting surfaces in the thrust and counter-thrust directions, but, contrary to this, almost straight wall regions in the pin direction which are greatly set back towards the piston central axis. On account of this measure, not only the frictional power losses caused by the contacting skirt surfaces were further reduced; a substantial saving in weight was achieved together with the shortening of the piston pin (c.f. EP-B-0 171 825, in particular FIG. 3).

In order to take the various loading ratios of the piston on the thrust and counter-thrust sides into account, it is additionally known to form the supporting surface on the thrust side, at least in the peripheral direction of the piston skirt, to be larger than the supporting surface on the counter-thrust side (c.f. EP-B-0 171 825, particularly FIG. 4).

The deficiency of these pistons according to the described state of the art results from the selected form or the selected shape of the wall sections which connect the supporting wall sections of the piston skirt with one another, as well as the type of joining of these wall sections to the sections of the piston skirt forming the supporting surfaces. In the known pistons, these connecting wall sections extend substantially linearly and perpendicularly to the piston axis or radially to the joining point at the cylindrical supporting wall section, thus providing the piston skirt with a large stiffness in the direction of the connecting rod pivoting plane, i.e. in the region of the supporting surface joining point. Furthermore, the transition from the straight wall sections into the cylindrical supporting surfaces with only one, mostly small radius of curvature results in a zone of high stress concentration.

On account of the continuously necessary elastic cushioning of the supporting skirt walls during operation of the motor, material cracks are easily generated in these critical transition zones. In the state of the art, these possible cracks are countered with material additions or rib-like reinforcements (see again EP-B-0 171 825, particularly FIGS. 3 and 4), which however, increase stiffness of the piston skirt and thus the risk of piston scuffing, and also work against the savings in weight that are sought.

In the piston according to Japanese utility model JP-A-64-3054 already described and forming the basis of the prior art, the supporting skirt wall section is not only greater on the thrust side in the pheripheral direction of the skirt than the supporting skirt wall section on the counter-thrust side as in the known piston already discussed (EP-B-0 171 825, FIG. 4), but the wall sections connecting the supporting skirt wall sections are also at least convexly curved outwardly in the region of the skirt beneath the pin boss. However, the transition regions between the supporting skirt wall sections and the connecting wall sections as well as between these and the pin bosses are still characterized by abrupt changes in direction, which results in the consequence that stress peaks occur there even though this piston is more elastic than the previously revealed type of piston on account of the convexity of the connecting wall sections.

Due to the fact that the pin bosses project radially outwardly with respect to the connecting wall sections, shorter supporting skirt wall sections result in the peripheral direction for given pin lenghts than when the outer surfaces of the connecting wall sections pass over into the outer pin boss surfaces in a flush manner, as in the known box piston (cf. EP-B-0 171 825, particularly FIG. 3). Therefore, the known piston has a higher surface compression.

Finally, a piston is described in the older but not pre-published EP-Al-0 430 362, the connecting walls sections of which extend convexly outwardly between the supporting skirt wall sections over the entire length of the shaft; however, this piston is symmetrically formed, ie. both supporting shaft wall sections are the same in the peripheral direction.

The technical problem with respect to this prior art forming the basis of the present invention is to provide a piston which ensures a high elasticity of the entire piston skirt when using a light mode of construction and in which no stress concentrations arise.

SUMMARY OF THE INVENTION

The above stated objective is satisfied with a piston having the initially mentioned features in that the outer surfaces of the connecting wall sections are flush with the outer pin boss surfaces, and that the connecting wall sections in the region of the pin bosses respectively extend convexly from the respective supporting skirt wall section to the outer pin boss surface.

BRIEF DESCRIPTION OF THE DRAWINGS

For explaining the advantages and particular design of the inventive piston, the figures of a preferred exemplified embodiment are already referred to here, as the inventive measures primarily relate to the shape of the piston and this shape is best seen in the attached drawings, in which:

FIG. 3 shows a cross-section through the piston according to the sectional line B—B of FIG. 1, FIG. 4 shows a cross-section through the inventive piston according to the sectional line A—A of FIG. 2.

Figure 1:
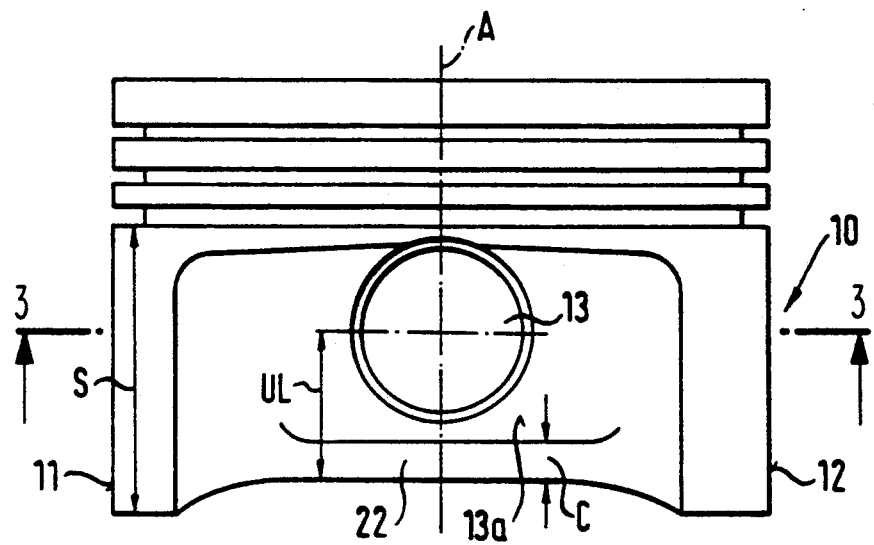
FIG. 1 shows a side view of the inventive piston in the piston pin direction.

Two diametrically opposite supporting surfaces are formed on the piston skirt, denoted with reference numeral 10, of the piston shown in the figures, the supporting surface on the counter-thrust side being denoted with 11 and the supporting surface on the thrust side with 12. The pin bosses 13 are set back with respect to the outer diameter D of the piston in the direction of the piston axis A, and in fact to the extent that the spacing between the outer pin boss surfaces 13a corresponds to a distance of 0.6 to 0.8 of the piston diameter D.

An essential measure in the depicted piston is that the two wall sections 20 connecting the supporting skirt wall sections 11, 12 are respectively continuously convexly curved outwardly along the periphery of the piston skirt at least at the open end of the skirt beneath the pin boss. This shape can be best seen in FIG. 4. From this, it is also apparent that the cross-sectional configuration of the piston skirt can be illustratively denoted as being "egg-shaped" as result of the continuously, convexly, outwardly curved wall section 20 as well as the substantially cylindrical supporting surfaces 11, 12, the counter-thrust supporting surface 11 being shorter in the peripheral direction than the thrust supporting surface 12.

However, the connecting wall sections 20 also have an essentially continuous, convexly outwardly curved progression in the cross section 3—3 according to FIG. 3, ie. at the level of the piston pin axis B. However, the planar outer pin boss surface 13a is intergrated into this wall progression so that the respective connecting wall section 20 is seperated into two respective partial sections 21 with respect to the mentioned convex progression.

Figure 2:
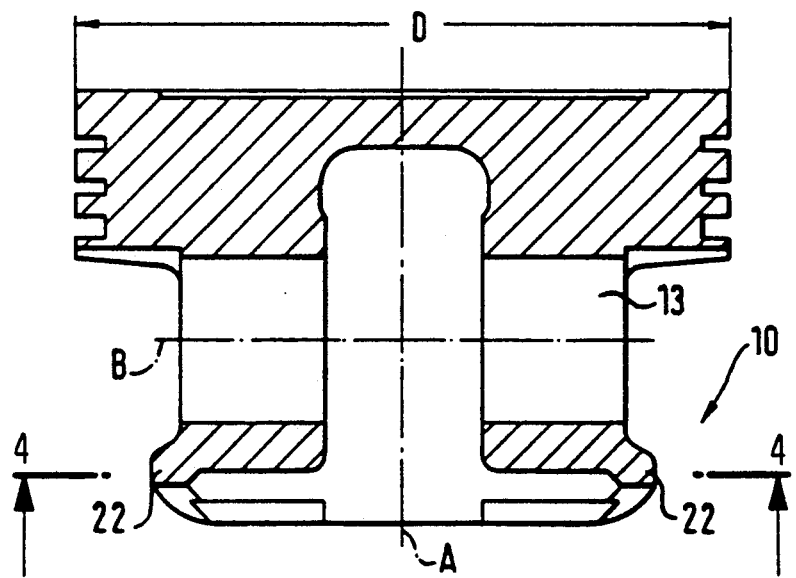
FIG. 2 shows an axial section through the piston according to FIG. 1.

It is also essential that the region of the connecting wall section 20 beneath the pin boss 13 is respectively formed as reinforcing bead 22 with a greater wall thickness than the remaining region of the skirt envelope. This region of the connecting wall sections is also best seen in FIG. 4; these connecting wall sections 22 are also apparent from FIGS. 1 and 2.

The outer contour 22a of the respectively reinforced wall section 22 lies on a curve with a radius $R_{oval}$ corresponding to about 110 to 120% of the piston diameter D, the central point M thereof being displaced a distance x in the direction towards the pressure side 12 of the piston corresponding to 5 to 10% of the piston diameter D, as shown in FIG. 4.

The height C (FIG. 1) of the respectively reinforced wall section 22 corresponds to 5 to 6% of the piston diameter D, while its wall thickness E (FIG. 4) amounts to 5 to 8% of the piston diameter D. The lower length of the skirt in the pin boss region amounts to about 10 to 22% of the piston diameter and to about 25 to 30% in the region of the supporting surface.

It is also provided for that the connection of the connecting wall section 20 to the supporting surfaces 11, 12 on the one hand as well as to the pin bosses 13a on the other hand includes smooth or harmonic transitional radii.

Additionally, the inner contour 21a of the skirt is on the one hand defined on the counter-thrust side substantially at the level of the pin boss 13 by a radius $R_6$ in the transitional region between the supporting surface 11 and the connecting wall section 21, which radius corresponds to 20 to 25% of the piston diameter D, and on the other hand by a radius $R_7$, which corresponds to about 105 to 111% of the piston diameter D in the region of the actual connecting wall section 21, as best shown in the upper region of FIG. 3. Both curves formed by the mentioned radii pass over into one another continuously in the shape of a clothoid on account of continuous change in the radius of curvature.

On the other hand, the inner contour 21b of the shaft is also generated on the pressure side substantially at the level of the pin hub 13 by a radius $R_8$ in the actual connecting wall section 21, which radius corresponds to 25 to 35% of the piston diameter D, and by a radius $R_9$ in the transition region between the supporting wall section 12 and the connecting wall section 21 which corresponds to 45 to 48% of the piston diameter D. Both curves formed by the mentioned radii pass into one another continuously in the form of a clothoid on account of continuous change in the radius of curvature.

The outer contour of the connecting wall sections 21 is formed on the basis of the same considerations. On the counter-thrust side, this outer contour 22c of the connecting wall section 21 is actually determined at the level of the pin boss 13 along the substantially length of its progression by the radius $R_{oval}$ of the reinforced wall section 22, and merges with the outer contour 22a of this wall section 22. On the contrary, the outer contour 22d of the connecting wall section 22 on the thrust side is formed substantially at the level of the pin boss 13 by a radius of curvature $R_3$, which proceeds from the outer pin boss surface 13a and leads away from this relative to the piston axis A, as well as by the radius $R_4$, by means of which the viewed connecting wall section 21 passes over into the supporting wall section 12, and is congruent, in the section adjacent the supporting wall section 12, with the outer contour 22a of the reinforced wall section 22 beneath the pin boss 13.

Further exemplified embodiments of the inventive piston may be taken from the claims for which a specific reference to the figures is not necessary.

The advantage of the inventive piston arrangement lies in that the lateral forces acting on the supporting surfaces are diverted via continuously curved, elastically resilient arc contours, while at the same time preventing local stress concentrations on the entire piston structure. This has the effect that, as in the case of an egg shell, thin walls can safely absorb large forces and a light construction as a whole is still achieved even with sufficient mechanical loadibility. In particular, it is possible on account of the reinforced wall section 22 with its inventively convex progression to smoothly but still effectively divert the transverse forces acting on the respectively loaded supporting surface to the unloaded opposing piston skirt section. The inventive light assembly piston ensures a high measure of bending strength of the piston crown in contrast to other light assembly constructions in the state of the art, in which the piston skirt is short in the extreme and designed in an open form for weight reduction and reduction of the friction power losses (DE-C-35 23 438).

In addition to the pistons already described, a further construction of a box-or H-piston is known (EP-A-0 385 390) in which the elasticity of the piston skirt, in particular in the connecting rod pivoting plane, is apparently improved by appropriate design of the wall sections connecting the supporting surfaces. According to this proposal, the substantially linear connecting wall sections of these supporting surface ends are approximately aligned radially inwardly in the direction towards the inner ends of the pin bosses. However, the connection of the respective connecting wall section at the associated cylindrical section of the skirt acting as the supporting surface represents a bending of over 90°, so that considerable stress peaks arise at this location together with the danger of material cracks as already described above. Thus, this known arrangement already proceeds in a completely different direction than the inventive proposal with respect to the direction of progression and the shape of the connecting wall sections.

A similar concept as the proposal mentioned above is known from U.S. Pat. No. 3,319,535. The wall sections of the skirt connecting the supporting skirt wall sections in this box-or H-piston are also adjoined at the inner end of the pin bosses. However, the respective region of the connecting wall sections between the supporting surface and the pin bosses are curved relatively strongly outwardly. Thus, the support surfaces in the peripheral direction and the elasticity of the skirt in the connecting rod pivoting plane are increased. However, on account of the relatively large curvature of this region along a short distance, stress peaks are inevitable, in particular in the region of the apex of the mentioned curve, but also at the strongly bent connection of the wall section at the inner end of the respective pin boss. Furthermore, in the known piston, the mentioned curved regions of the connecting wall sections are spanned at the level of the pin bosses by linear wall sections, the lengths of which correspond approximately to the outer diameter of the pin bosses. Consequently, the entire progression of the connecting wall sections—as seen in the direction of the piston periphery—are characterized by strong changes in curvature and direction. In contrast, the present inventive development is characterized by a harmonic progression of the entire cross section of the piston skirt, particularly in the region of the open end of the shaft, on account of which the transverse forces perpendicular to the pin axis are smoothly but still effectively diverted, as already outlined.

We claim:

1. In a piston for internal combustion engines having substantially circular sleeves,
   a piston skirt having a diameter, thrust and counter-thrust sides and being substantially closed along its periphery,
   pin bosses set back with respect to the piston skirt diameter in the direction towards the piston axis to an extent that the spacing between the outer pin boss surfaces corresponds to 60 to 80% of a piston diameter,
   two supporting skirt wall sections on the piston skirt on the thrust and counter-thrust sides to receive transverse forces,
   the supporting skirt wall section on the thrust side being larger at least in the peripheral direction of the skirt than the supporting skirt wall on the counter-thrust side, and two wall sections connecting the supporting skirt wall sections which are respectively continuously convexly curved outwards along the periphery of the piston skirt at least at the open ends of the skirt, the improvement comprising
   the connecting wall sections bordering in a circumferential direction from the pin bosses being positioned with their outer surfaces passing flush into the outer surfaces of the pin bosses, and extending convexly from the respective supporting skirt wall to the outer pin boss surface.

2. Piston according to claim 1 in which the region of the connecting wall sections at the open skirt end is respectively formed as a reinforcing bead with a wall thickness greater than an adjacent region of the skirt.

3. Piston according to claim 2 in which the outer contour of the reinforcing bead lies on a circular arc with a radius corresponding to about 110 to 120% of the piston diameter, the center point of which is displaced relative to the pin axis at a distance corresponding to 5 to 10% of the piston diameter in a direction towards the thrust side of the piston.

4. Piston according to claim 2 in which the height of the respective reinforcing bead corresponds to 5 to 6% of the piston diameter, while its wall thickness amounts to 5 to 8% of the piston diameter.

5. Piston according to claim 1 in which a joining point of the connecting wall sections to the supporting skirt wall sections has smooth transition radii.

6. Piston according to claim 5 in which the inner contour of the skirt on the counter-thrust side is determined substantially at the level of the pin bosses by a curve with a radius in the transition region between the supporting skirt wall section and the connecting wall section which corresponds to about 20 to 25% of the piston diameter, the curvature continuously changing by continuous change in the radius of curvature into a curvature with a radius in the region of the connecting wall section which corresponds to about 105 to 111% of the piston diameter.

7. Piston according to claim 5 in which the inner contour of the skirt on the thrust side is determined substantially at the level of the pin bosses by a curvature with a radius in the transition region between the supporting skirt wall section and the connecting wall section which corresponds to 45 to 48% of the piston diameter, the curvature continuously changing by continuous change in the radius of curvature into a curvature with a radius in the region of the connecting wall section which corresponds to 25 to 35% of the piston diameter.

8. Piston according to claim 1 in which the center contour of the connecting wall section on the counter-thrust side is determined substantially at the level of the pin bosses along a substantial part of its length by the radius of the reinforcing bead and is congruent with the outer contour thereof.

9. Piston according to claim 1 in which the outer contour of the connecting wall section on the thrust side is determined substantially at the level of the pin bosses by a radius of curvature proceeding from the outer pin boss surface and leading away from the piston axis, and by a radius with which the connecting wall section passes over into the supporting wall section, and wherein the connecting wall section is congruent in its section adjacent the supporting wall section with the outer contour of the reinforcing bead at the open skirt end.

10. Piston according to claim 1 in which the supporting wall section on the thrust side comprises about 80 to 100 arc degrees in the peripheral direction and the supporting wall section on the counter-thrust side comprises about 70 to 80 arc degrees.

11. Piston according to claim 1 in which the skirt wall thickness on the thrust side is greater than that on the counter-thrust side, and amounts to about 2.5% of the piston diameter at the thinnest location on the thrust side and to about 2% of the piston diameter at the thinnest location on the counter-thrust side.

12. Piston according to claim 1 in which the skin height amounts to about 35 to 45% of the piston diameter.

13. Piston according to claim 1 in which the lower length of the skirt in the pin boss region amounts to about 18 to 22% of the piston diameter and to about 25 to 30% in the region of the supporting surface.

* * * * *